United States Patent [19]

Jensen

[11] Patent Number: 5,033,175
[45] Date of Patent: Jul. 23, 1991

[54] TIRE RASP BLADE

[75] Inventor: Wayne E. Jensen, Olympia Fields, Ill.

[73] Assignee: B & J Manufacturing Company, Glenwood, Ill.

[21] Appl. No.: 483,581

[22] Filed: Feb. 21, 1990

[51] Int. Cl.⁵ ............................................. B23D 67/06
[52] U.S. Cl. .......................................... 29/78; 29/79; 29/80
[58] Field of Search ...................................... 29/78–80; 30/263–265, 347, 356, 380, 388

[56] References Cited

U.S. PATENT DOCUMENTS

| | | | |
|---|---|---|---|
| 3,074,148 | 1/1963 | Hemmeter | 29/79 |
| 3,528,151 | 9/1970 | Walter | 29/78 |
| 3,747,177 | 7/1973 | Jensen | 29/78 |

Primary Examiner—Frederick R. Schmidt
Assistant Examiner—Jack Lavinder
Attorney, Agent, or Firm—Niro, Scavone, Haller & Niro

[57] ABSTRACT

A tire rasp blade and rasp hub assembly is disclosed. The tire rasp blade has an elongated body and an arcuate working edge with a plurality of teeth. The elongated blade includes an angled intermediate portion and generally planar end portions, thereby establishing a body having a broad V-shape. A plurality of V-shaped blades are assembled with adjacent spacers to form a circumferentially inter-locking hub assembly.

5 Claims, 1 Drawing Sheet

U.S. Patent  July 23, 1991  5,033,175
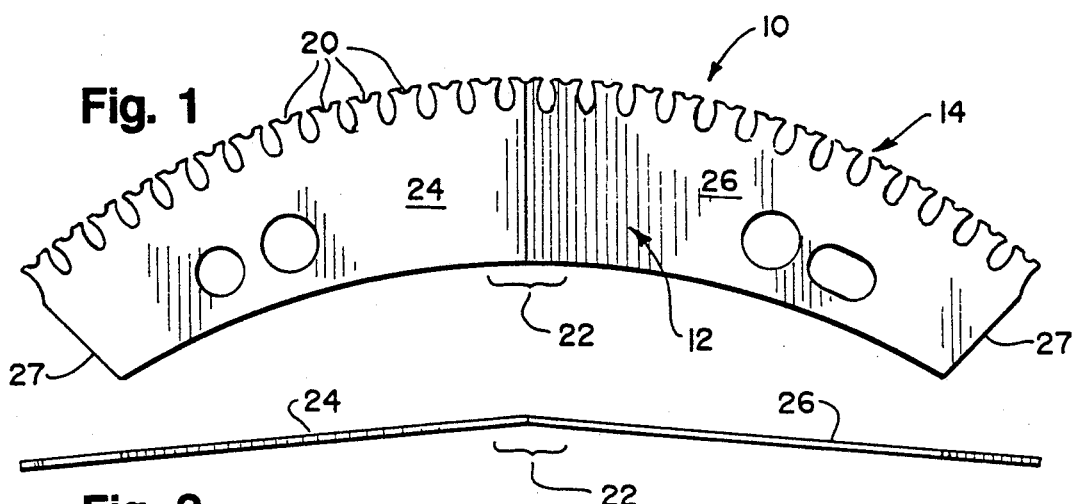
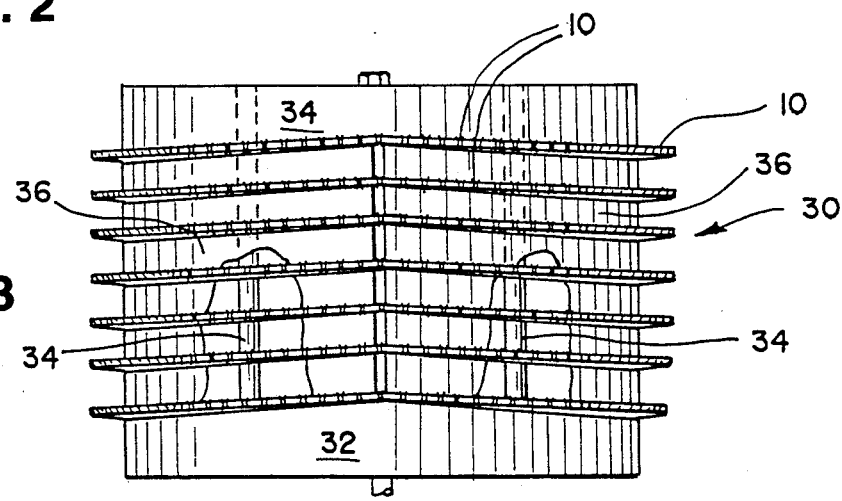
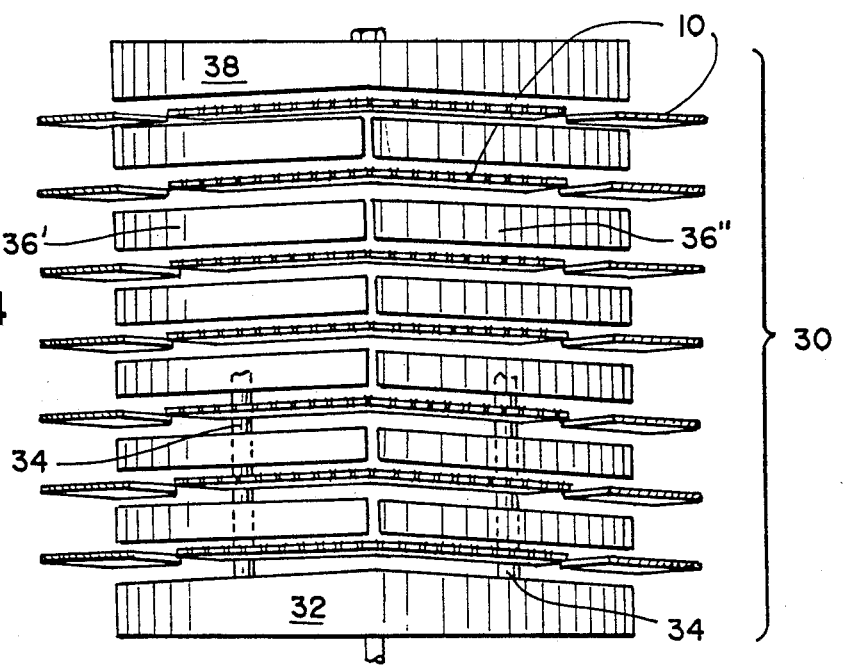

TIRE RASP BLADE

BACKGROUND OF THE INVENTION

The present invention relates to a new rasp blade for use in tire buffing machines. More particularly, the present invention relates to a tire rasp blade having a new and unique configuration to permit its more effective and safe assembly into the conventional rasp hub of a tire buffing machine.

Tire buffing machines are well known in the tire retreading industry. Conventionally, a tire buffing machine includes both a structure for mounting a used tire and a rasp hub which removes the worn tread from the used tire prior to the retreading process. The used tire is rotated while it is held against the rapidly rotating rasp hub whose outside perimeter is provided with a multitude of tire rasp blades. When so engaged against the used tire, the blades cut or shear small segments of rubber from the worn tread surface area of the tire. In this way, the tire is "buffed" to remove the unwanted used tread and to achieve an evenly textured surface suitable for retreading.

Tire rasp blades, together with intervening spacers, are assembled on the periphery of the rasp hub between the hub front and back plates. U.S. Pat. Nos. 2,703,446 and 4,019,234 disclose such conventional prior art rasp hub assemblies wherein the back plate of the hub has axially directed support pins on which are mounted the rasp blades and spacers. The front plate is then disposed onto the support pins against the assembled blades and spacers and locked into place. The disclosures of U.S. Pat. Nos. 2,703,446 and 4,019,234 are incorporated herein by reference.

While these prior art tire buffing machine hub assemblies have proven generally satisfactory, they nevertheless suffer certain disadvantages. For example, because the blades and spacers are always mounted to the hub in coextensive, side-by-side alignment, the blades and spacers are not interlocked around the circumference of the hub. Thus, a failure of any pair of support pins can result in a catastrophic hub failure. Moreover, the use of conventionally aligned spacers and blades produces undesirable lines in the buffed tire surface. These lines reduce the uniformity of texture on the buffed surface and may lead to premature retread failure.

Therefore, a need exists for a more effective and safer rasp hub assembly.

SUMMARY OF THE INVENTION

The present invention is directed to a new tire rasp blade having a shape and configuration which permits rasp hub assemblies to overcome the disadvantages associated with prior art designs.

In accordance with the present invention, a tire rasp blade is provided having an elongated body and an arcuate working edge with a plurality of teeth. The elongated body includes an angled intermediate portion and generally planar end portions, thereby establishing a body in the shape of a broad, flattened V.

This V-shaped configuration allows the rasp blades to span adjacent spacers to thereby form a circumferentially interlocking assembly between the rasp blades and the spacers of the rasp hub assembly.

BRIEF DESCRIPTION OF THE DRAWINGS

The novel features of the present invention are set forth in the appended claims. However, the invention's preferred embodiments, together with further objects and attendant advantages, will be best understood by reference to the following detailed description taken in connection with the accompanying drawings in which:

FIG. 1 is a side elevational view of the tire rasp blade of the present invention;

FIG. 2 is a bottom view of the tire rasp blade illustrated in FIG. 1;

FIG. 3 is a plan view of a rasp hub assembly making use of the tire rasp blade in FIG. 1; and FIG. 4 is an exploded view of the rasp hub assembly of FIG. 3.

DETAILED DESCRIPTION OF THE PREFERRED EMBODIMENTS

With reference to FIGS. 1 and 2, the tire rasp blade of the present invention is designated generally as 10 and includes an elongated body 12, an inner edge 40 and an outer arcuate working edge 14. The body 12 is provided with mounting holes 16 and 18 whose function will be described later. The working edge 14 is comprised of a plurality of teeth 20. Any number of different tooth designs may be employed in the present invention, such as those described in U.S. Pat. Nos. 2,896,309; 3,082,506; 3,618,187; 3,879,825; 4,021,899; 4,059,875 and 4,091,516, the disclosures of which are incorporated herein by reference. Likewise, various working edge configurations may be employed, such as those described in U.S. application Ser. Nos. 166,176 filed Mar. 10, 1988 and 340,920, filed Apr. 28, 1989, whose disclosures are also incorporated by reference.

In accordance with the present invention, the body 12 is provided with an intermediate angled portion 22 and two generally planar end portions 24 and 26. The vertices of the intermediate angled portion 22 extend from the working edge 14 to the inner edge 40. In the preferred embodiment, the intermediate angled portion 22 lies along the line connecting the apex (or outermost point) of the working edge 14 with the apex of the inner edge 40. Thus, in plan view, the body 12 has the shape of a broad, flattened V. Preferably, the angle formed in blade 10 is between about 3° and 6°, most preferably between 4° and 5°.

FIGS. 3 and 4 illustrate a rasp hub assembly 30 which incorporates the rasp blade 10 of the present invention. In addition to the rasp blades, the hub assembly 30 includes a back plate 32 having a plurality of axially extending support pins 34, a plurality of spacers 36, and a front plate 38. As clearly illustrated, the spacers extend circumferentially around the periphery of the hub in end-to-end angularly offset relation. Thus, by way of example, spacers 36' and 36" are offset by an angle which corresponds to the angle formed in the body 12 of the rasp blade 10. As a result, the rasp blades 10 may be assembled in hub 30, with the pins 34 inserted through holes 16 and 18, so that the blades span between adjacent spacers and form a mechanical interlock between them. Likewise, the ends 27 of each blade 10 are positioned at the center of neighboring spacers 36. The novel tire rasp blade and rasp hub assembly of the present invention provide a safer and more dependable rasp hub. Because of the angled V-shaped configuration of the blades 10, each blade overlies and is connected with two circumferentially aligned spacers. Thus, the hub is circumferentially interlocked, creating a safer hub with less potential for mechanical failure at high rotational speeds. Moreover, tests conducted with the rasp hub assembly of the present invention have proven that the circumferential lines created in the buffed surface by prior art devices are substantially reduced or entirely eliminated. As a result, better retreading performance is achieved.

It will be appreciated by those skilled in the art that various modifications and changes can be made to the illustrated embodiments without departing from the spirit of the present invention. All such modifications and changes are intended to be covered by the appended claims.

I claim:

1. A rasp hub assembly for use in a tire buffing machine comprising:
   a plurality of rasp blades each including a one-piece elongated body having an outer arcuate working edge, said working edge including a plurality of teeth and an arcuate inner edge, said elongated body having an intermediate angled portion which forms a vertex, and two generally planar end portions extending from said intermediate portion, wherein the two planar end portions intersect to form said vertex;
   a plurality of spacers arranged in longitudinal circumferential rows;
   two end plates; and
   said rasp blades and said spacers being assembled between said end plates with each rasp blade being positioned in side-by-side relation to at least a portion of two longitudinally adjacent spacers.

2. The tire rasp assembly of claim 1, wherein each of said blades overlies and is connected with two of said spacers, said spacers being circumferentially aligned.

3. A tire rasp blade for use in a tire buffing machine comprising:
   a one-piece elongated body having an arcuate outer working edge comprised of a plurality of teeth and an arcuate inner edge;
   said body including an intermediate angular portion which forms a vertex, said vertex extending from a point on said outer arcuate working edge to the inner edge, and said body further including two generally planar end portions extending from said intermediate angular portion, wherein the two planar end portions intersect to form said vertex.

4. The tire rasp blade of claim 3, wherein the vertex of said angular portion extends radially from about the center of said outer arcuate working edge to about the apex of said inner edge.

5. The tire rasp blade of claim 3, wherein said end portions of said body form an angle between 3° and 6° with a horizontal plane passing through the vertex.

* * * * *